(12) United States Patent
Davis et al.

(10) Patent No.: US 6,462,329 B1
(45) Date of Patent: Oct. 8, 2002

(54) FIBER BRAGG GRATING REFERENCE SENSOR FOR PRECISE REFERENCE TEMPERATURE MEASUREMENT

(75) Inventors: Michael A. Davis, Glastonbury; David R. Fournier, Ashford; Richard T. Jones, Hamden, all of CT (US)

(73) Assignee: Cidra Corporation, Wallingford, CT (US)

( * ) Notice: Subject to any disclaimer, the term of this patent is extended or adjusted under 35 U.S.C. 154(b) by 0 days.

(21) Appl. No.: 09/448,367

(22) Filed: Nov. 23, 1999

(51) Int. Cl.$^7$ .............................. G01J 1/04; G01J 5/08
(52) U.S. Cl. ...................... 250/227.14; 250/231.19; 73/705; 385/37
(58) Field of Search ..................... 250/227.14, 227.19, 250/227.27, 231.19; 73/705, 708; 359/130, 569, 573; 385/37

(56) References Cited

U.S. PATENT DOCUMENTS

| | | | |
|---|---|---|---|
| 4,065,715 A | 12/1977 | Jaffe et al. | 374/184 |
| 4,121,461 A | 10/1978 | Butler et al. | 374/171 |
| 4,315,413 A | 2/1982 | Baker | |
| 4,488,823 A | 12/1984 | Baker | |
| 4,765,184 A | 8/1988 | Delatorre | 327/362 |

(List continued on next page.)

FOREIGN PATENT DOCUMENTS

| | | | |
|---|---|---|---|
| DE | 205524 | 12/1983 | 374/183 |
| EP | 892250 A1 | 1/1999 | |
| GB | 2269230 A | 2/1994 | |
| JP | 59225324 | 12/1984 | |
| SU | 1506297 | 9/1989 | 374/183 |
| SU | 1560989 | 4/1990 | 374/183 |
| WO | 9836252 | 8/1998 | |

OTHER PUBLICATIONS

Song, E. A., "Simultaneous Measurement of Temperature and Strain Using Two Fiber Bragg Gratings Embedded in a Glass Tube", Optical Fiber Technology, US, Acadamic Press, London, vol. 3, No. 2, Apr. 1, 1997, ISSN: 1068–5200 (whole document).

Patent Abstract of Japan, "Electronic Thermometer", vol. 009, No. 101 (P–353), May 2, 1985.

(List continued on next page.)

*Primary Examiner*—Stephone Allen
(74) *Attorney, Agent, or Firm*—Ware, Fressola, Van Der Sluys & Adolphson LLP

(57) ABSTRACT

A fiber Bragg grating reference module provides a precise temperature reference for a temperature probe, including a thermistor, located in close proximity thereto, and includes an optical fiber having a fiber Bragg grating therein, a glass element and a reference housing. The fiber Bragg grating has two ends and with a coefficient of thermal expansion. The glass element anchors the two ends of the fiber Bragg grating, and has a substantially similar coefficient of thermal expansion as the coefficient of thermal expansion of the fiber Bragg grating to ensure that the glass element does not substantially induce strain on the fiber Bragg grating as the ambient temperature changes. The reference housing has a cavity and also has a means for receiving and affixing one end of the fiber Bragg grating and for suspending the fiber Bragg grating in the cavity leaving the other end of the fiber Bragg grating free to move as the ambient temperature changes without inducing strain in the fiber Bragg grating. The glass element includes a glass tube collapsed over the entire length of the fiber Bragg grating. Alternatively, the glass element includes a glass tube locally collapsed at the two ends of the fiber Bragg grating over a part of length of the fiber Bragg grating.

17 Claims, 3 Drawing Sheets

U.S. PATENT DOCUMENTS

| | | | |
|---|---|---|---|
| 4,841,458 A | 6/1989 | Levine et al. | 374/184 |
| 4,872,124 A | 10/1989 | Shimizu et al. | 327/513 |
| 4,939,395 A | 7/1990 | Asano et al. | 327/513 |
| 5,042,898 A | 8/1991 | Morey et al. | |
| 5,046,859 A | 9/1991 | Yamaguchi | 374/185 |
| 5,255,975 A | 10/1993 | Adams | |
| 5,469,520 A | 11/1995 | Morey et al. | |
| 5,691,999 A | 11/1997 | Ball et al. | |
| 5,838,437 A | 11/1998 | Miller et al. | |
| 5,862,170 A | 1/1999 | Britton, Jr. et al. | 374/184 |
| 5,877,426 A | 3/1999 | Hay et al. | |
| 6,217,211 B1 | 4/2001 | Hesky | 374/184 |
| 6,276,215 B1 * | 8/2001 | Berg | 250/227.14 |
| 6,321,603 B1 * | 11/2001 | Berg | 73/705 |

OTHER PUBLICATIONS

Hammon, T. E., "A Temperature Compensated Optical Fibre Bragg Grating Band Rejection Filter and Wavelength Reference", Technical Digest, Optoelectronics and Communications Conference, Proceedings of OECC, Jul. 1996, XP000901103.

"Applications of Optical Fiber Bragg Grating Sensors for the Seismic Industry" printed by CiDRA Corp., May 1998, pp. 1–12.

* cited by examiner

FIBER BRAGG GRATING REFERENCE SENSOR FOR PRECISE REFERENCE TEMPERATURE MEASUREMENT

CROSS-REFERENCE TO RELATED APPLICATIONS

This patent application is related to and co-filed with patent applications identified by U.S. patent application Ser. No. 09/447,483 filed Nov. 23, 1999 (WFVA/CiDRA Ref Nos. 712-2-60/CC 0178) and U.S. patent application Ser. No. 09/448,003 filed Nov. 23, 1999 (WFVA/CiDRA Ref Nos. 712-2-77/CC 0219), both hereby incorporated by reference in their entirety.

BACKGROUND OF INVENTION

1. Technical Field

The present invention relates to a reference sensor; and more particularly to a reference sensor having a fiber Bragg grating therein.

2. Description of Related Art

Fiber Bragg gratings have found many uses, one of which is the use thereof as wavelength reference elements. They possess the capability to provide an extremely accurate and stable optical signal centered about a well defined wavelength region. This property permits them to act as dependable references for use in such applications as instrumentation designed to accurately read optical signals.

SUMMARY OF INVENTION

The present invention provides a fiber Bragg grating reference sensor that will permit the use of an optical fiber having a fiber Bragg grating therein as a precise reference sensor.

A fiber Bragg grating is inherently sensitive to parameters such as temperature and strain, both of which will shift the resonance condition within the device and, therefore, affect the reflected signal from the grating. The temperature sensitivity can be on the order of 10 picometers per degree Celsius. To utilize the fiber Bragg grating as a reference it must be isolated from any changes in these parameters, or they must be controlled and measured. In the present invention, the fiber Bragg grating is completely isolated from strain but allowed to drift freely with temperature. The temperature can then be measured and a knowledge of the fiber Bragg grating response to temperature can be utilized to determine the exact wavelength thereof. With this approach, the temperature of the fiber Bragg grating is measured accurately and precisely, but without affecting the fiber Bragg grating itself, or the thermal expansion characteristics of the fiber Bragg grating. If the fiber Bragg grating is potentially restricted in movement as the temperature thereof changes, this may induce a strain over the fiber Bragg grating and cause a change in the wavelength reading.

The fiber Bragg grating itself must be strain relieved to prevent any strain effects, and this can be achieved by anchoring both outer ends of the grating to a glass element which has the same coefficient of thermal expansion (CTE) as the fiber Bragg grating itself. The anchoring will ensure that the glass strain relief will not induce additional strain on the fiber Bragg grating as the ambient temperature changes. Additionally, the fiber Bragg grating may be stripped of any external coating or buffer to eliminate the potential strain effects from the external coating and buffer. The anchoring may be achieved either by collapsing a glass tube over the entire length of the fiber Bragg grating, or by simply locally collapsing a glass tube at two ends of the fiber Bragg grating so that the glass tube surrounds and encases the fiber Bragg grating. The glass tube is then held in a fixture which does not permit strain into the tube and the fiber Bragg grating therein. The fixture is achieved by attaching one end of the tube or glass element containing the fiber Bragg grating to a reference housing, leaving the other end free to move. Additionally, the glass element does not contact the reference housing other than the contact at the attached end. This is necessary to assure that over a temperature change the differences of the coefficient of thermal expansion between the two materials do not cause friction or sticking which would cause the fiber Bragg grating to strain and produce an error term. Good heat conduction is also maintained between the reference housing and the fiber Bragg grating by minimizing all air gaps. Where an air gap is required, the depth and length should be minimized to reduce the insulating capacity of the cavity. In addition, because the attachment end of the fiber Bragg grating should be in as much contact with the reference housing as possible, only a thin layer of epoxy holds the fiber Bragg grating. This will facilitate the movement of heat from the reference housing into the fiber Bragg grating and ensure that the fiber Bragg grating and the reference housing maintain the same temperature. To accurately correlate the temperature of the fiber Bragg grating and the temperature measured externally, a temperature probe such as a thermistor should be located as closely as possible to the fiber Bragg grating and in contact with the reference housing.

In order to minimize the effects of a temperature differential to exist between the fiber Bragg grating and the thermistor, particularly when the environmental temperature is rapidly changing, good thermal conductive and insulating layers are used to surround the fiber Bragg grating and thermistor. For example, the fiber Bragg grating and thermistor are embedded in a good thermal conductive material, such as aluminum. This conductive material acts to rapidly distribute the heat present in the block equally throughout the block, and prevent thermal gradients from occurring. Besides an insulating layer is placed around the thermal conductive material (also known as a thermal mass block) to prevent rapid temperature changes from exceeding the heat distribution capabilities of the block and creating a thermal gradient across the entire block. By effectively increasing the time constant for the thermal block, a rapid temperature change in the environment will not cause a differential temperature between the fiber Bragg grating and the thermistor.

The foregoing and other objects, features and advantages of the present invention will become more apparent in light of the following detailed description of exemplary embodiments thereof, as illustrated in the accompanying drawing, which are not drawn to scale.

DETAILED DESCRIPTION OF THE INVENTION

Figure 1:
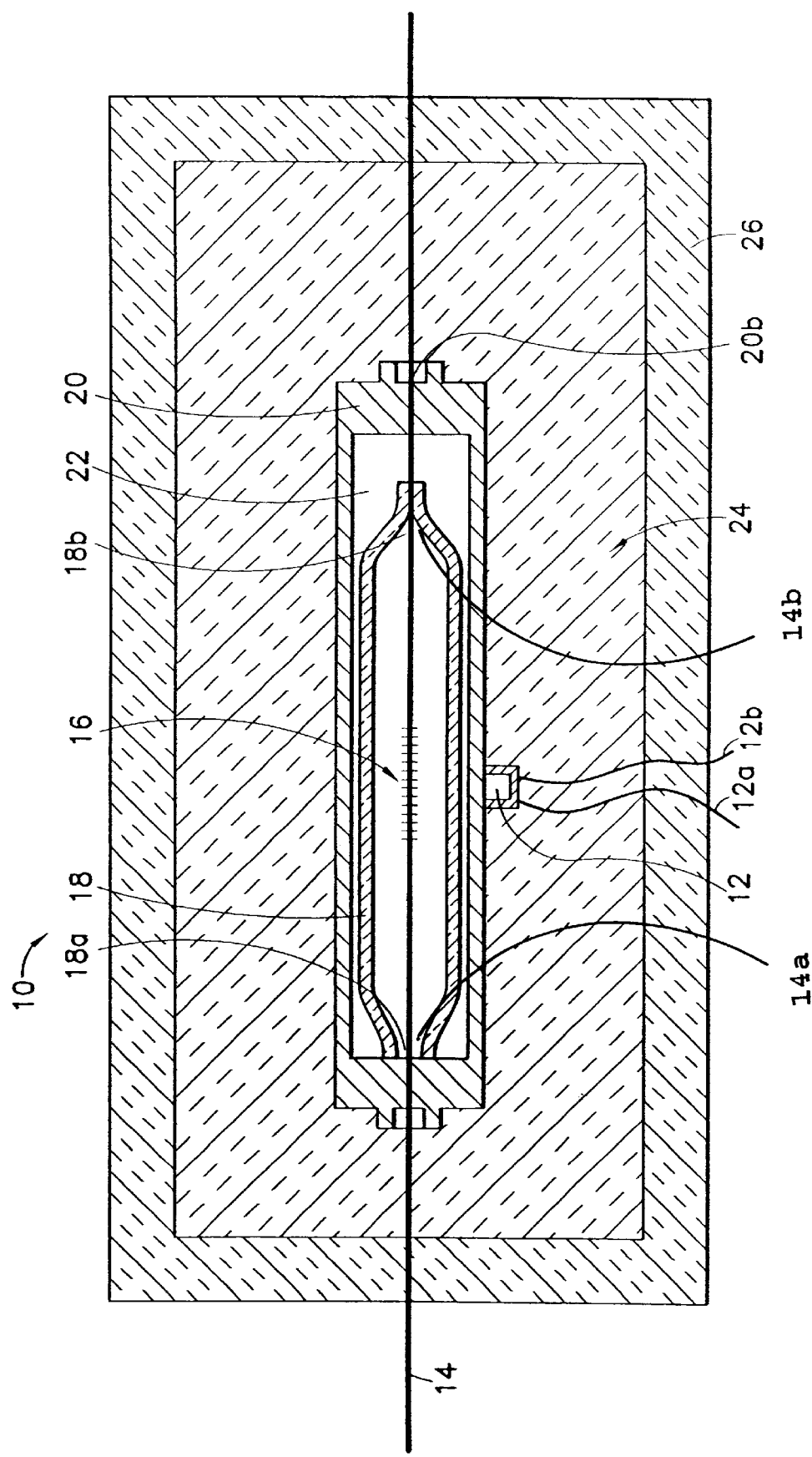
FIG. 1 is a diagram of a fiber Bragg grating reference module that is the subject matter of the present invention.

FIG. 1 shows a fiber Bragg grating reference module generally indicated as 10 for providing a precise temperature reference for a temperature probe or thermistor 12 located in close proximity thereto. The fiber Bragg grating reference module shown and described herein is a part of an overall system shown and described in the aforementioned cross-referenced patent applications. The temperature probe or thermistor 12 has two electrical conductors 12a, 12b for coupling to instrumentation or other equipment that is not shown in FIG. 1. The temperature probe or thermistor 12 is known in the art, and the scope of the invention is not intended to be limited to any particular type thereof. Embodiments are also envisioned wherein the present invention is used together with other temperature dependent sensor devices.

The fiber Bragg grating reference module 10 includes an optical fiber 14 having at least one fiber Bragg grating 16 therein, a glass element 18 shown and described below as a partially collapsed tube, and a reference housing 20. The fiber Bragg grating 16 is written into the optical fiber 14 and therefore is made of the same material as the glass fiber 14 having the same coefficient of thermal expansion. The fiber Bragg grating 16 is known in the art and is the result of an induced change in the index of refraction in the optical fiber 14, normally caused by ultraviolet radiation. The fiber Bragg grating 16 preferably has no external coating or buffer to eliminate potential undesirable strain effects from changes in the ambient temperature.

As shown, the glass element is a locally collapsed tube that anchors the two ends 14a, 14b of the fiber which the Bragg grating 16 is written into, surrounding the fiber Bragg grating 16. Techniques for collapsing glass on fiber are known in the art, and the reader is referred to patent application Ser. No. 09/400,364 (CC 0128A), filed Sep. 20, 1999, assigned to the assignee of the present application, hereby incorporated by reference in its entirety, as an example of the same. The glass tube 18 is also made from a material such as a glass having a substantially similar coefficient of thermal expansion as the coefficient of thermal expansion of the optical fiber which the Bragg grating is written into to ensure that the glass tube 18 does not substantially induce strain on the fiber Bragg grating as the ambient temperature changes. The optical fiber 14, the fiber Bragg grating 16 therein and the glass tube or element 18 are made out of a substantially similar glass material. The scope of the invention is not intended to be limited to the type of glass material of the optical fiber 14, the fiber Bragg grating 16 therein or the glass tube or element 18. Alternatively, the glass tube or element 18 may include a glass tube collapsed over the entire length of the fiber Bragg grating, which is also known in the art and not shown herein. The processes for collapsing the glass is over a part of, or the entire length of, the two ends 18a, 18b is known in the art, and the scope of the invention is not intended to be limited to any particular way of doing the same.

The reference housing 20 has a cavity generally indicated as 22 and also has a means for receiving and affixing one end 18a of the glass tube or element 18 and for suspending the element in the cavity 22 leaving the other end 18b of the glass tube or element 18 free to move as the ambient temperature changes without inducing strain in the fiber Bragg grating 16. The means for receiving and affixing is an aperture generally indicated as 130a shown and described in relation to FIG. 3. The glass tube or element 18 should not contact the reference housing 20 other than the contact at the one affixed end 18a to assure that over the ambient temperature changes any difference in the coefficient of thermal expansion between the glass tube 18 and the reference housing 20 does not cause friction or sticking which would cause the fiber Bragg grating 16 to strain and produce an error term. The reference housing 20 has a two-piece construction, and each piece is substantially symmetrical in dimension for fitting together to form the cavity 22. The reference housing 20 also has a second aperture 20b for passing the other end 18b of the glass tube or element 18 so as not to induce strain in the fiber Bragg grating 16.

The temperature probe or thermistor 12 is arranged in ID close proximity and in contact to an outer surface of the reference housing 20 to accurately correlate the temperature of the fiber Bragg grating 16 and the temperature measured externally.

In the sensor 10, all air gaps are minimized between the glass tube 18 and the reference housing 20, as well as the glass tube 18 and the fiber Bragg grating 16, to ensure that good heat conduction is maintained therebetween.

The fiber Bragg grating reference module 10 also includes a good thermal conductive layer 24 and an insulating layer 26 surrounding the reference housing 20 and the thermistor 12 to minimize the effects of a temperature differential between the fiber Bragg grating 16 and the thermistor 12, particularly when the environmental temperature is rapidly changing.

The thermal conductive layer 24 is in the form of a thermal conductive housing 24 that is also known herein as a thermal mass block to rapidly and equally distribute the heat present therein and prevent thermal gradients from occurring between the fiber Bragg grating 16 and the thermistor 12, when the environmental temperature is rapidly changing. The thermal conductive housing 24 is a two-piece metal housing, made of aluminum, or any other good thermal conductive material, and has a cavity (not shown) for receiving the temperature probe or thermistor 12. The scope of the invention is intended to include any good thermal conductive material.

The thermal insulating layer 26 is in the form of an insulating layer placed around the thermal mass block 24 to prevent rapid temperature changes from exceeding the heat distribution capabilities of the thermal mass block 24 and creating a thermal gradient entirely across the thermal mass block 24, in order to effectively increase the time constant of the thermal mass block 24, so a rapid temperature change in the environment will not cause a differential temperature between the fiber Bragg grating 16 and the thermistor 12.

A thermal grease (not shown) may be applied between the interface of the thermal conductive housing 24 and the reference housing 20 and also between the interface of the thermal conductive housing 24 and the thermistor 12.

Figure 2:
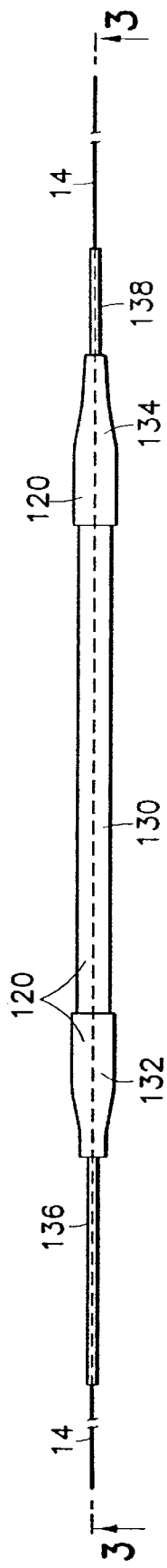
FIG. 2 is a diagram of a reference housing of the subject matter of the present invention.

FIG. 2 is a diagram of a part of a reference sensor similar to the reference sensor 10 in FIG. 1, but which is shown and discussed in more detail in relation to FIGS. 2–6. In FIG. 2, the part of the reference sensor has among other things a reference housing 120 similar to the reference housing 20 shown in FIG. 1. Similar elements in FIGS. 2–6 are shown using similar reference numeral similar to that used in FIG. 1, as well as similar reference numerals increased by one hundred.

In FIG. 2, the reference housing 120 includes a tubing 130 and shrink fit tubings 132, 134 on each end thereof. The tubing 130 is made of metal and the shrink fit tubings 132, 134 are made of plastic and shrink fit over the two ends of the tubing 130. The reference housing 120 also has microbore tubing 136, 138 extending therefrom for providing the optical fiber 14 from the reference housing 120.

Figure 3:
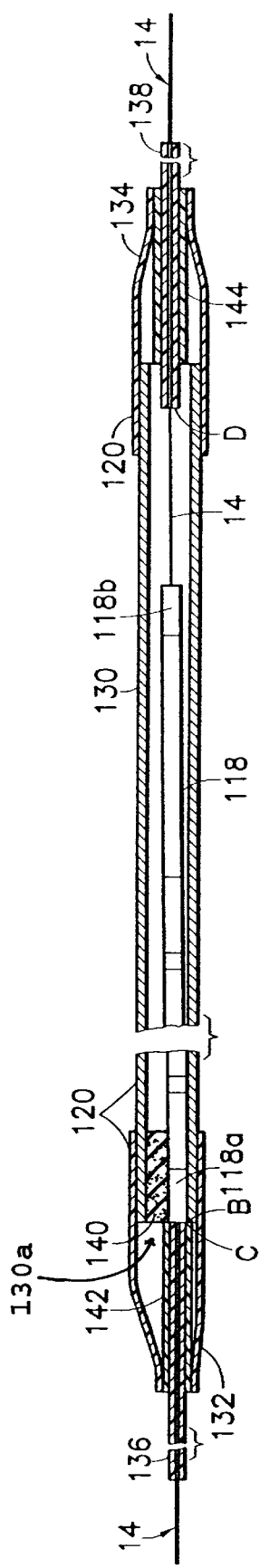
FIG. 3 is a cross-section of the reference housing along lines 3—3 in FIG. 2.

FIG. 3 is a cross-section of the reference housing 120 along lines 3—3 in FIG. 2. A glass tube 118 is affixed to the reference housing 120 at one end 118a (see end 18a in FIG. 1), and is adapted to suspend within the center of the reference housing 120 at the free end 118b (see end 18b in FIG. 1).

On the left side of the reference tubing 120 shown in FIG. 3, the end 118a of the glass tube 118 is affixed by a silicon rubber sealant or epoxy 140 to the end of the tubing 130. As shown, the one end 118a is affixed so as to make and maintain immediate contact with the inner wall of the tubing 130 in proximity to location B. The contact between the one end 118a of the glass tube 118 and the inner wall of the tubing 130 at one end 118a provides excellent heat transfer therebetween.

One end of the tubing 130 is designated at location C. To the left of location C as shown, the optical fiber 14 is passed through and free to move inside the shrink fit tubing 132. A shrink fit tubing 142 is arranged between the shrink fit tubing 132 and the microbore tubing 136, and provides a convenient way for passing the microbore tubing 136 through the shrink fit tubing 132. The non-symmetrical shape of the shrink fit tubing 132 provides for ease of manufacturing and good thermal transfer to and from the glass tube 118.

On the right side of the reference tubing 20 as shown in FIG. 3, the optical fiber 14 passes from the glass tube 118 into the microbore tubing 138 at location D. A shrink fit tubing 144 is arranged between the shrink fit tubing 134 and the microbore tubing 138, and provides a convenient way for passing the microbore tubing 138 through the shrink fit tubing 134. Inside the microbore tubing 138, the optical fiber 14 is free to move. The microbore tubing 138 provides strain relief to minimize microbending of the optical fiber 14 moving therein.

Figure 4:
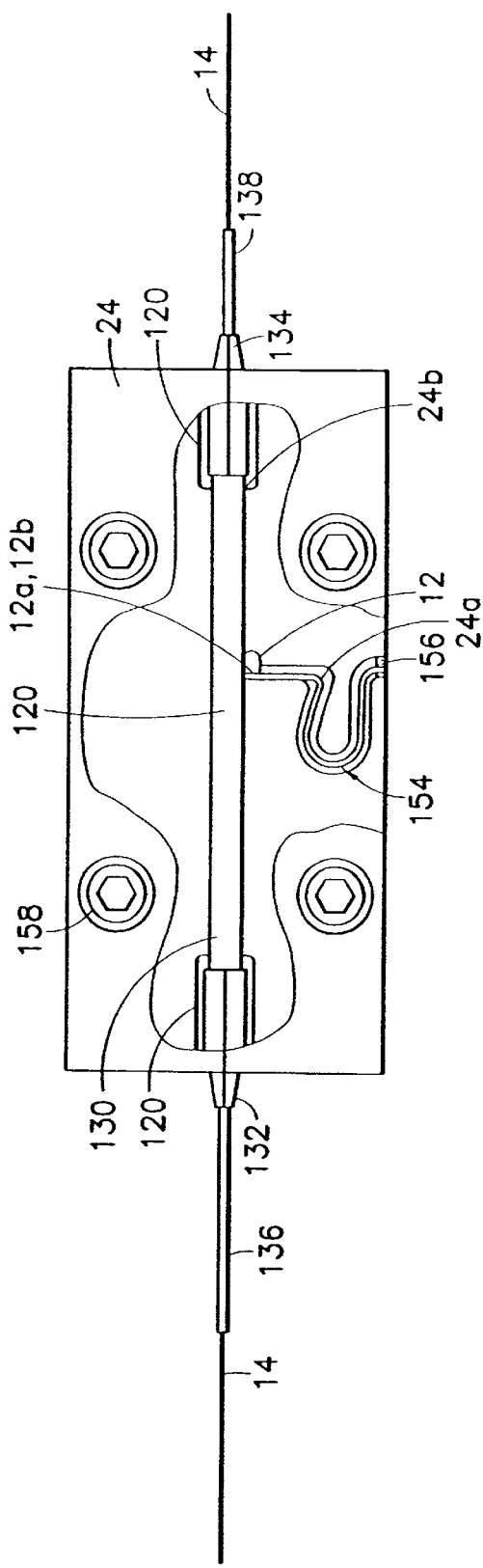
FIG. 4 is a cut-away diagram of a part of a fiber Bragg grating reference module that is the subject matter of the present invention.
Figure 5:
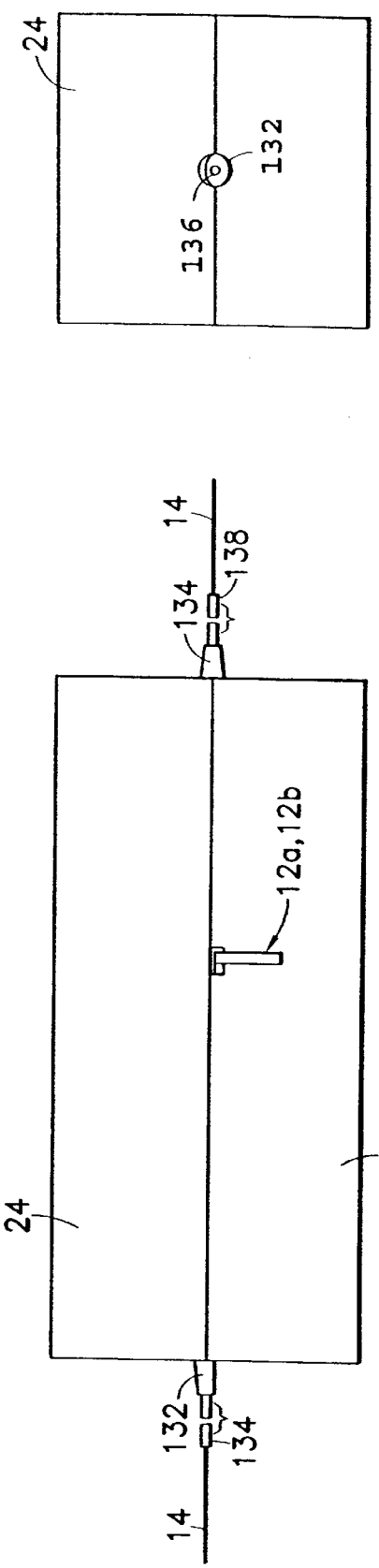
FIG. 5 is a side view of the fiber Bragg grating reference module shown in FIG. 4.

FIG. 4 is a cut-away diagram of a part of a fiber Bragg grating reference module, including the reference housing 120 (see FIG. 2 and 3) and a thermistor 12 (see FIG. 1) arranged inside cavities generally indicated as 24a, 24b of a two-piece thermal conductive housing 24 (see also FIGS. 1 and 5). The thermistor 12 has leads 12a, 12b arranged in polyamide tubings generally indicated as 154 and is affixed and sealed within the two-piece thermal conductive housing 24 by silicon rubber 156. The two-piece thermal conductive housing 24 is coupled together by bolts generally indicated as 158. The insulation 26 in FIG. 1 is not shown in FIG. 4.

Figure 6:
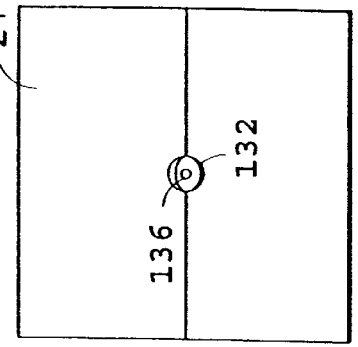
FIG. 6 is an end view of the fiber Bragg grating reference module shown in FIG. 4.

FIG. 6 is an end view of the fiber Bragg grating reference module shown in FIG. 4, where the glass tube 118 is affixed to the reference housing 120 at one end. FIG. 6 shows the two-piece thermal conductive housing 24, the shrink fit tubing 132 and the microbore tubing 136.

SCOPE OF THE INVENTION

Although the invention has been described and illustrated with respect to exemplary embodiments thereof, the foregoing and various other additions and omissions may be made therein and thereto without departing from the spirit and scope of the present invention.

We claim:

1. A fiber Bragg grating reference module for providing a precise temperature reference for a temperature probe, including a thermistor, for measuring a temperature, and being located in close proximity thereto, comprising:

an optical fiber having a fiber Bragg grating therein and being made from a material having a coefficient of thermal expansion;

a glass element for anchoring two ends of the optical fiber containing the fiber Bragg grating, and being made from a substantially similar material having a substantially similar coefficient of thermal expansion as the coefficient of thermal expansion of the material of the fiber Bragg grating to ensure that the glass element does not substantially induce strain on the fiber Bragg grating as the temperature changes; and a reference housing having a cavity and having means for receiving and affixing one end of the fiber Bragg grating and for suspending the fiber Bragg grating in the cavity, leaving the other end of the fiber Bragg grating free to move as the temperature changes without inducing strain in the fiber Bragg grating.

2. A fiber Bragg grating reference module according to claim 1, wherein the glass element includes a glass tube collapsed over the entire length of the fiber Bragg grating.

3. A fiber Bragg grating reference module according to claim 1, wherein the glass element includes a glass tube locally collapsed at the ends of the glass tube containing the fiber Bragg grating but not collapsed at the fiber Bragg grating.

4. A fiber Bragg grating reference module according to claim 1, wherein the fiber Bragg grating has no external coating or buffer to eliminate potential undesirable strain effects from the temperature changes.

5. A fiber Bragg grating reference module according to claim 1, wherein the glass element does not contact the reference housing other than the contact at the one end affixed to the reference housing to assure that over the temperature changes any difference in the coefficient of thermal expansion between the glass element and the reference housing does not cause friction or sticking which would cause the fiber Bragg grating to strain and produce an error term.

6. A fiber Bragg grating reference module according to claim 1, wherein all air gaps are minimized between the glass element and the reference housing, and the glass element and the fiber Bragg grating, to ensure that good heat conduction is maintained therebetween.

7. A fiber Bragg grating reference module according to claim 1, wherein the means for receiving and affixing the one end of the fiber Bragg grating and for suspending the fiber Bragg grating in the cavity is an aperture having a surface; and wherein a thin layer of epoxy holds the one end of the fiber Bragg grating in the aperture of the reference housing to maximize contact between the one end of the fiber Bragg grating and the surface of the aperture to facilitate movement of heat from the reference housing into the fiber Bragg grating and ensure that the fiber Bragg grating and the reference housing maintain the substantially same temperature.

8. A fiber Bragg grating reference module according to claim 1, wherein the one end of the fiber Bragg grating has a diameter; and wherein the means for receiving and affixing one end of the fiber Bragg grating includes an aperture having a diameter that is slightly larger than the diameter of the one end of the fiber Bragg grating for receiving the same.

9. A fiber Bragg grating reference module according to claim 1, wherein the reference housing has a two-piece construction.

10. A fiber Bragg grating reference module according to claim 1, wherein the reference housing has an aperture for passing the other end of the fiber Bragg grating without inducing strain in the fiber Bragg grating.

11. A fiber Bragg grating reference module according to claim 1, wherein the temperature probe is arranged in close proximity and in contact to an outer surface of the reference housing to accurately correlate the temperature of the fiber Bragg grating and the temperature.

12. A fiber Bragg grating reference module according to claim 1, wherein the fiber Bragg grating reference module further comprises good thermal conductive and insulating layers surrounding the reference housing and the thermistor to minimize the effects of a temperature differential between the fiber Bragg grating and the thermistor, particularly when the environmental temperature is rapidly changing.

13. A fiber Bragg grating reference module according to claim 12, wherein the fiber Bragg grating reference module further comprises a thermal conductive housing that is a thermal mass block to rapidly and equally distribute the heat present therein and prevent thermal gradients from occurring between the fiber Bragg grating and the thermistor, particularly when the environmental temperature is rapidly changing.

14. A fiber Bragg grating reference module according to claim 13, wherein the thermal conductive housing is a two-piece metal housing.

15. A fiber Bragg grating reference module according to claim 13, wherein the thermal mass block is made of aluminum, which is a good thermal conductive material.

16. A fiber Bragg grating reference module according to claim 13, wherein the fiber Bragg grating reference module further comprises a thermal grease between the thermal conductive housing and the reference housing.

17. A fiber Bragg grating reference module according to claim 13, wherein the fiber Bragg grating reference module further comprises an insulating layer arranged around the thermal mass block to prevent rapid temperature changes from exceeding the heat distribution capabilities of the thermal mass block and creating a thermal gradient entirely across the thermal mass block, in order to effectively increase the time constant of the thermal mass block, so a rapid temperature change in the environment will not cause a differential temperature between the fiber Bragg grating element and the thermistor.

* * * * *

UNITED STATES PATENT AND TRADEMARK OFFICE
CERTIFICATE OF CORRECTION

PATENT NO. : 6,462,329 B1  Page 1 of 1
DATED : October 8, 2002
INVENTOR(S) : Michael A. Davis et al.

It is certified that error appears in the above-identified patent and that said Letters Patent is hereby corrected as shown below:

Column 3,
Line 34, after "tube" -- 18 -- should be inserted.

Column 4,
Line 15, "ID" should be deleted.

Signed and Sealed this

Twenty-ninth Day of April, 2003

JAMES E. ROGAN
*Director of the United States Patent and Trademark Office*